No. 841,951. PATENTED JAN. 22, 1907.
W. J. EVANS.
FISH HOOK.
APPLICATION FILED AUG. 11, 1906.

WITNESSES
Edward Thorpe.
C. W. Fairbank

INVENTOR
William J. Evans
BY
ATTORNEYS

UNITED STATES PATENT OFFICE.

WILLIAM J. EVANS, OF MINNEAPOLIS, MINNESOTA.

FISH-HOOK.

No. 841,951.　　　　Specification of Letters Patent.　　　　Patented Jan. 22, 1907.

Application filed August 11, 1906. Serial No. 330,256.

*To all whom it may concern:*

Be it known that I, WILLIAM J. EVANS, a citizen of the United States, and a resident of Minneapolis, in the county of Hennepin and State of Minnesota, have invented a new and Improved Fish-Hook, of which the following is a full, clear, and exact description.

This invention relates to a new and improved fish-hook to which the bait may be secured without injuring the latter in any manner and on which the bait may be maintained alive for a great length of time.

In most fish-hooks now in use it is necessary to insert a portion of the hook or some of its attachments through some portion of the body of a minnow or frog used as bait, thus causing the minnow or frog to suffer, also causing it to die in a short time. It is a well-recognized fact that live bait is far superior to dead bait, while in my inproved fish-hook there is nothing whatever which tends to shorten the life of the bait being used.

In my improved fish-hook the bait is fully exposed at all times, but cannot escape from the hook or be detached therefrom by the fish; but at the same time no part of the hook is passed through the body of the bait and the frog, which is the bait preferably used, may swim about, and it may even rise to the surface and breathe with nearly as great freedom as though the hook were not attached. As the bait may freely swim about, its actions may serve to attract the attention of fish, and thus increase the chances of catching them. The cruelty now necessarily enacted by sportsmen in fastening live bait upon the hooks is entirely obviated.

Reference is to be had to the accompanying drawings, forming a part of this specification, in which similar characters of reference indicate corresponding parts in all the figures, in which—

Figure 1:
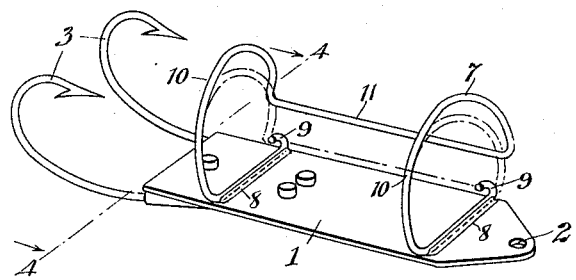
Figure 2:
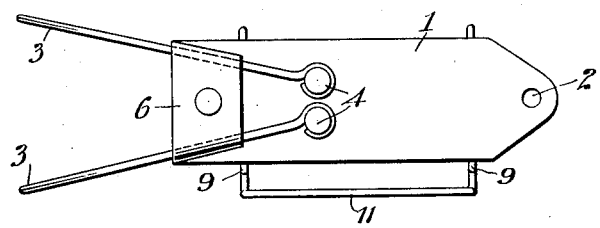
Figure 3:
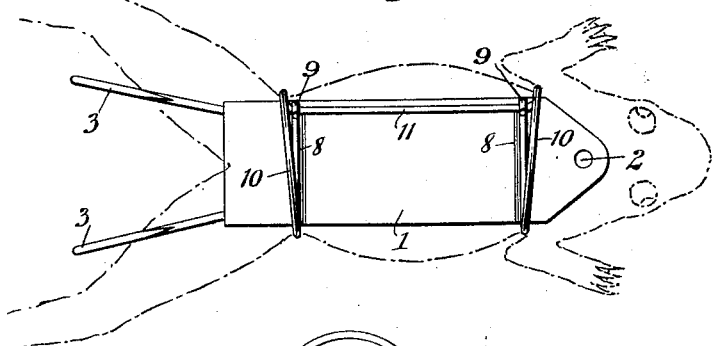
Figure 4:
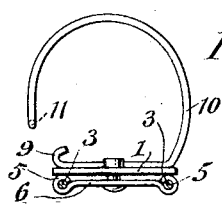

Figure 1 is a perspective view of my improved fish-hook. Fig. 2 is an inverted plan view of the same. Fig. 3 is a plan view showing a frog secured to the hook, and Fig. 4 is a vertical section on the line 4 4 of Fig. 1.

My invention comprises a thin narrow plate 1, having a suitable hole 2 for a ring or other means at one end thereof to which the fishing-line may be secured and having hooks 3 secured at the opposite end in any suitable manner. Preferably these hooks have their ends curved and riveted to the plate 1 by rivets 4 and have their intermediate portions passing through grooves formed in the inturned edges 5 of a separate plate 6, riveted or soldered to the under side of the main plate 1. The hooks curve upward and have their ends extending toward the point of attachment for the fish-line, while the bait is secured to the upper side of the plate intermediate the hooks and the line.

I prefer to use frogs as the bait on my improved fish-hook, and for securing them in place without cruelly injuring or mutilating them I provide a spring-wire clamp 7, preferably formed from a single piece of wire and having its end portions 8 soldered to the plate 1 and terminating in two hooks 9. The intermediate portion of the wire is bent to form two bows 10, which are connected by the central portion 11 of the wire.

In the use of my improved fish-hook the frog is placed on the plate and beneath the clamp. One of the wire bows 10 extends over the frog, just back of his fore legs, while the other one extends over just in front of his hind legs. The straight intermediate portion 11 is then fastened beneath the two hooks 9, and the frog is thus firmly held to the plate, although his legs are free to move and he may swim about while carrying the plate and its hooks attached to his body. The bows are preferably made of such size that the frog cannot wiggle out from under them; but still they are not tight enough to injure the frog or prevent it from kicking and swimming. It is necessary that the frog should breathe, and he may do so by swimming to the surface at any time and carrying the hook along with him. As the frog cannot escape of his own free will, it is evident that he cannot be pulled out by the fish, and there is no danger of the bait becoming lost off the hook.

As it is entirely unnecessary to injure the frog in any way whatsoever in securing him to the hook, a great deal of the cruelty now enacted is entirely obviated, and from a humane standpoint my improved device is far superior to anything heretofore known.

It is evident that minor changes may be made in the device without departing from the spirit of my invention—as, for instance, in employing different means for securing the hooks to the plate or making certain changes in the means for attaching the frog thereto, as such changes will be obvious to one skilled in the art.

Having thus described my invention, I claim as new and desire to secure by Letters Patent—

1. In combination, a hook, a flat support on which the bait may rest, a plurality of bands rigidly secured to the support at one side thereof and adapted to bind the bait to said support, and means for detachably securing the ends of said bands to the opposite side of said flat support, whereby the bait may be firmly secured to said support.

2. In combination, a plate, a hook attached to one end of said plate, and a spring-wire clamp secured to one side of said plate and adapted to surround the bait and means on the opposite side of said plate to which the clamp may be fastened.

3. In combination, a plate, a hook secured to one end of said plate, a wire bow secured to said plate adjacent each end thereof and adapted to surround the body of the bait, and means whereby the free end of said bow may be secured to the plate.

4. In combination, a plate adapted to have a line secured to one end thereof, hooks secured to the opposite end of said plate, and a spring-wire clamp having the ends thereof extending across said plate and soldered thereto, said ends terminating in hooks, and the intermediate portion of said clamp bent to form two bows adapted to surround the body of the bait to fasten same to the plate, said intermediate portion connecting said bows and adapted to be secured beneath the said hooks.

5. In combination, a plate having fish-hooks secured to one end thereof, and means for securing a frog to said plate, said means comprising two spring-wire bows having one end of each secured to one side of the plate, and means for securing the opposite ends of said bows to the other side of the plate, one of said bows being adapted to surround the body of the frog in front of the hind legs and the other adapted to surround the body of the frog back of the fore legs.

In testimony whereof I have signed my name to this specification in the presence of two subscribing witnesses.

WILLIAM J. EVANS.

Witnesses:
R. S. WIGGIN,
WILLIAM SAUNDERS.